United States Patent [19]
Ferrentino

[11] 3,793,864
[45] Feb. 26, 1974

[54] WAVEGUIDE WINDING MACHINE

[75] Inventor: Antonio Ferrentino, Monza, Italy

[73] Assignee: Industrie Pirelli Societe per Azioni, Milan, Italy

[22] Filed: Nov. 8, 1972

[21] Appl. No.: 304,653

[30] Foreign Application Priority Data
Nov. 15, 1971 Italy.................................. 31095/71

[52] U.S. Cl..................... 72/136, 72/145, 242/1, 242/82
[51] Int. Cl............................................. B21d 11/08
[58] Field of Search.............. 242/7.23, 7.14, 82, 1; 156/425, 428, 436, 439, 443, 459, 173; 140/92 T; 264/174, 173; 172/136, 145

[56] References Cited
UNITED STATES PATENTS

| 3,140,968 | 7/1964 | Barrios et al. | 156/192 |
| 3,431,158 | 3/1969 | Poulsen | 156/443 |
| 2,875,570 | 3/1959 | Sarracino | 57/13 |
| 3,147,934 | 9/1964 | Godderidge | 242/82 |
| 3,032,073 | 5/1962 | Moore | 140/92.2 |
| 3,490,713 | 1/1970 | Nystrom | 242/82 |

Primary Examiner—Billy S. Taylor
Attorney, Agent, or Firm—Brooks Haidt & Haffner

[57] ABSTRACT

Apparatus for manufacturing a waveguide having an inner wall formed by one or more helically wound, insulated straps wound on edge and an outer covering of insulating material, said apparatus comprising strap reels, feed rollers, reel brakes and strap tension devices mounted for rotation around a fixed, varying diameter mandrel on which the strap or straps are wound on edge and means for advancing the turns axially of the mandrel having a plurality of cam operated pistons for pushing the turns along the mandrel. The mandrel is followed by a covering insulation extruder and a collecting reel.

10 Claims, 6 Drawing Figures

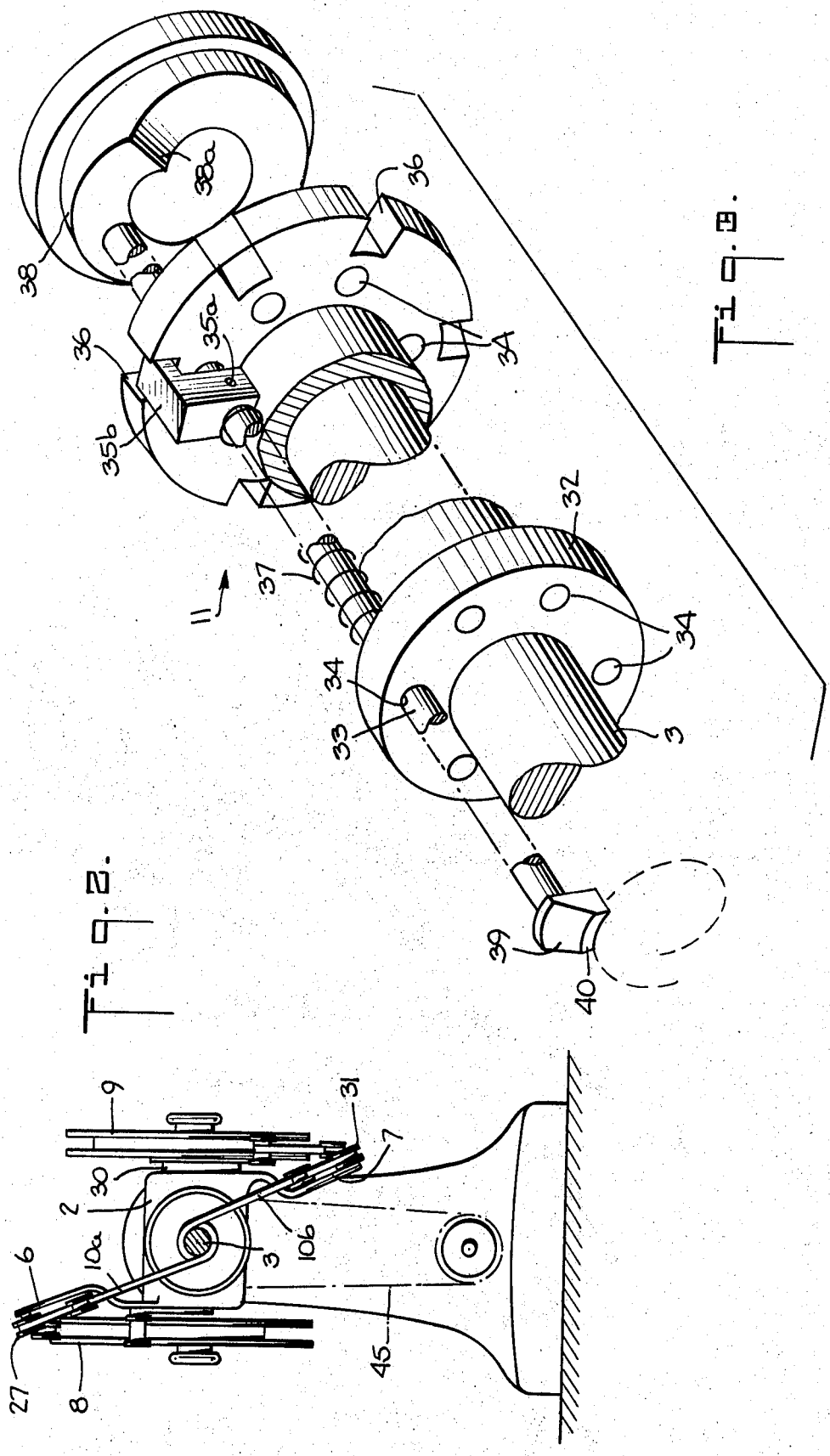

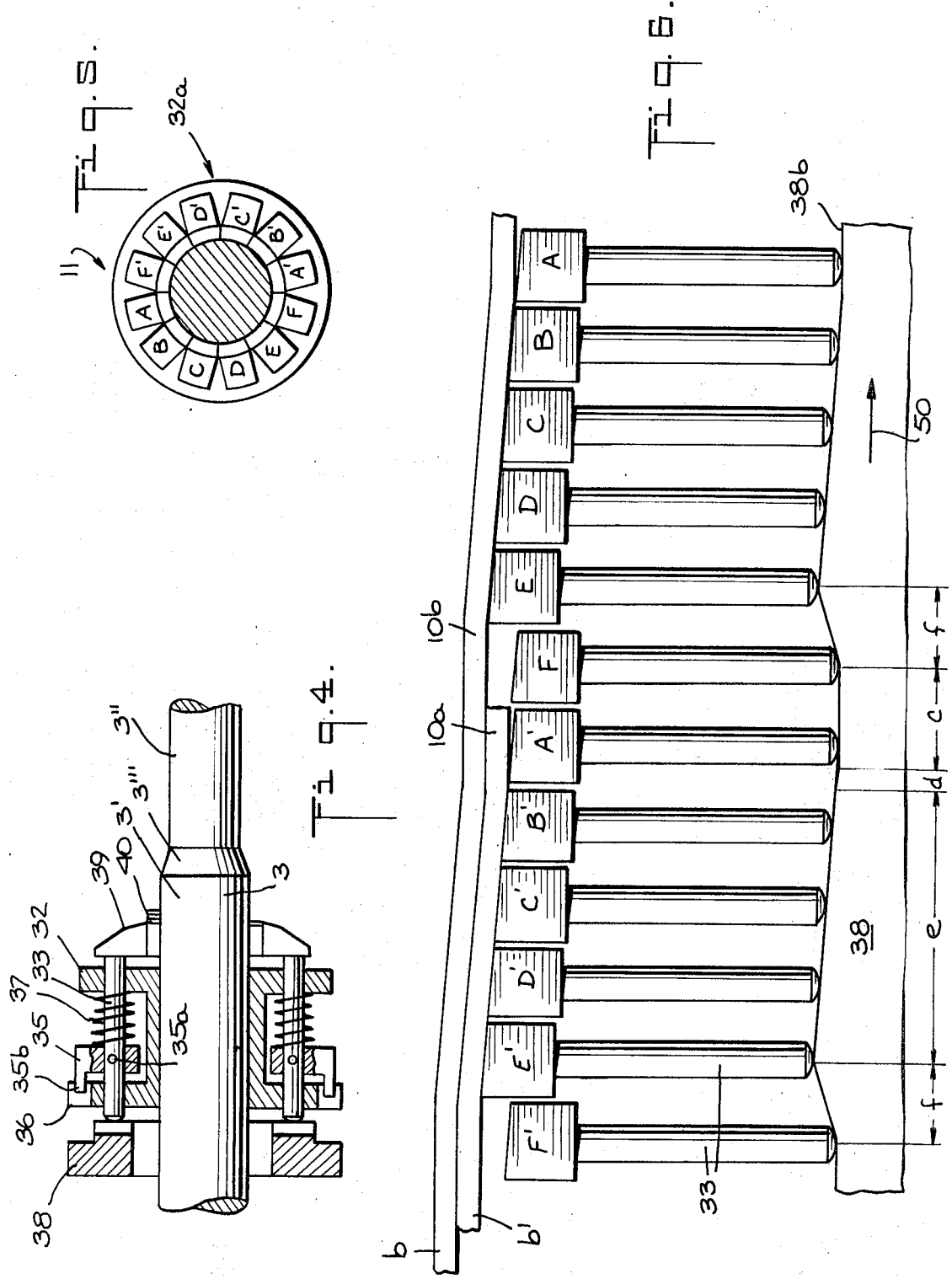

WAVEGUIDE WINDING MACHINE

The present invention relates to apparatus for converting one or more metal straps into a cylindrical helix obtained by winding up said straps on edge about a mandrel, i.e., with the major surfaces of the straps in planes extending at a large angle to the axis of the mandrel.

In particular, the invention refers to an apparatus for the formation of a cylindrical helix to be used as a waveguide.

Apparatus for the formation of a cylindrical helix from filamentary elements or elements having a circular section are already known. For the most part, said apparatus comprises a winding cage, the reels containing the elements to be wound up being situated at the end of said cage, and said elements are paid out from the reels by means of appropriate tensioning members. The combination of the forward movement originated by said tensioning members with the rotation movement of the winding cage about a mandrel gives rise to the formation of the helix.

An important requirement to be complied with during the formation of the helix is that its turns should be properly aligned. In fact, the process for the manufacture of a waveguide involves the passage of the helix into an extrusion press, in which the turns are covered with a material which is suitable for extrusion over the helix. If the turns were arranged irregularly, said irregular condition would also be maintained in the finished product as the extruded covering would make the irregularity permanent, and, as is known to those skilled in the art, non-aligned turns of a waveguide result in a bad performance of the latter from the electrical point of view.

One way to overcome this disadvantage would be to subject the turns to a considerable tension to keep them adherent to the mandrel and to prevent the formation of wrinkles. This solution, however, involves the drawback, which has not been eliminated up to this time, that it is difficult to move the helix forward because of the friction between the helix and the mandrel which would impede the advancement of the turns along the mandrel.

Other difficulties are encountered when the helix is to be made from an insulated strap instead of a filamentary element or one having a circular section. Some of these difficulties are those that are due to the necessity not to damage, during the deformation of the strap, the layer of insulating enamel present on the strap itself and those that are due to the formation of a multi-start or multiple strap, helix in which a plurality of straps, side-by-side are wound into a helix simultaneously.

The present invention has, as one object, the winding up on edge of one or more straps about a mandrel to obtain a cylindrical helix, preventing the formation of wrinkles in the helix about said mandrel and allowing an easy advancement of the turns, all without any damage to the layer of insulating enamel on the strap or straps.

Accordingly, one object of the present invention is an apparatus for the formation of one or more straps wound on edge as a cylindrical helix about a fixed part by means of the roation of a moving part, said apparatus being characterized in that it comprises a mandrel constituted by a first portion, followed by a second portion of smaller diameter, the first portion being connected to the second portion in a gradually decreasing way, an advancing system for pushing the helically formed strap or straps along said mandrel, and a braking device for adjusting the tangential winding tension of the strap or straps in the first portion and the residual tangential tension in the second portion.

In one embodiment of the invention, the advancing system comprises a cam, coaxial with the mandrel and rotatable in relation to the mandrel, the profile of which extends in a direction circumferential to the mandrel to push the strap or straps wound up about the mandrel in a direction parallel to the axis of the mandrel.

The present invention will be better understood from the following detailed description of a preferred embodiment of the invention, which description should be considered in conjunction with the accompanying drawings, in which:

FIG. 2 is a cross-sectional, end elevation view of the apparatus in FIG. 1 and is taken along the line 2—2 indicated in FIG. 1;

FIG. 3 is an enlarged, perspective view of the advancing device for a one-start helix forming part of the apparatus of the invention;

FIG. 4 is a longitudinal, sectional view of the advancing device illustrated in FIG. 3;

FIG. 5 is an end elevation view of a portion of an advancing device for a two-start helix; and FIG. 6 is a laid-out representation of the profile of the cam of the advancing device.

Figure 1:
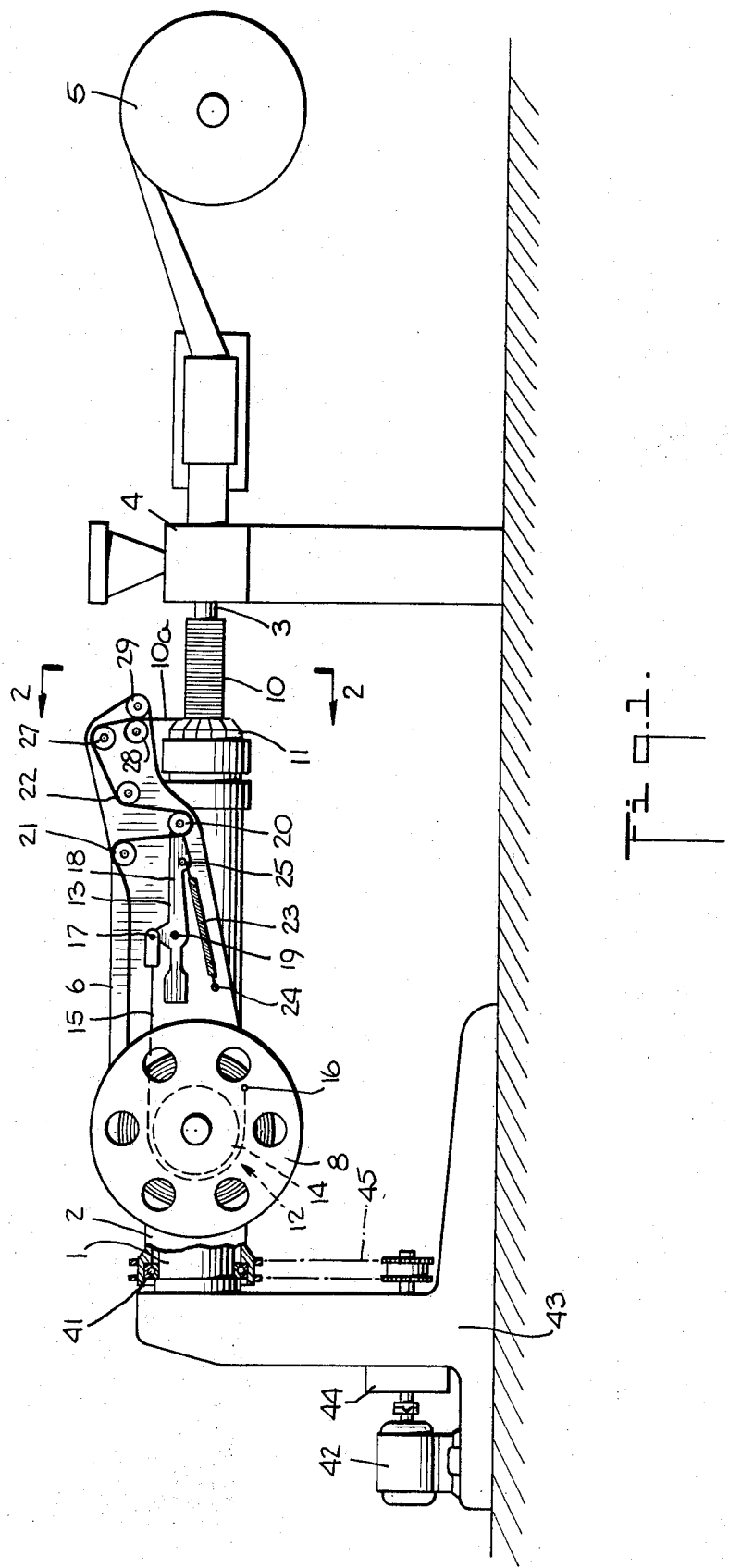
FIG. 1 is a longitudinal, side elevation view of the apparatus of the invention.

As shown in FIG. 1, the apparatus of the present invention comprises a main fixed shaft 1, a rotatable winding shaft 2 coaxial with and rotatable with respect to the shaft 1, a mandrel 3, a covering press 4 and a collecting drum 5. The winding shaft 2 is provided at its sides with two supporting plates 6 and 7 (FIGS. 1 and 2), each of which carries, inter alia, reels 8 and 9 for the supply of the two straps 10a and 10b, since the illustrated apparatus serves to form a two-start helix 10.

The winding shaft 2 is also provided with an advancing system 11, having the task of pushing towards the press 4 the helix 10 formed by the straps which are wound up on the mandrel 3 in consequence of the rotation of said winding shaft 2. As mentioned hereinbefore, the straps are to be wound up under a tension of pre-established value in order to prevent the formation of wrinkles, and therefore the straps are subjected to the action of a braking device 12 (FIG. 1) in order to keep them under constant tension. A device 13 sensitive to the strap tension is associated with said braking device 12.

The braking device 12 is secured to a plate 6 and comprises a braking pulley 14 coaxial with the reel 8 and a braking belt 15 which extends partly around said pulley 14, along an arc less than 360°, and which is fixed at one end 16 to a fixed point on the plate 6 and at the other end to a moving point 17 on a lever 18, hereinafter called "dynamometric arm," forming part of the tension sensitive device 13. Said arm is mounted on the plate 6 by means of a first pivot pin 19.

The tension sensitive device 13 also comprises a roller 20, hereinafter called "dynamometric roller", and first and second return rollers, respectively indicated with reference numerals 21 and 22. The dynamometric roller 20 is rotatably mounted on one end of the arm 18, while the two rollers 21 and 22 are rotatably mounted on the plate 6, respectively at the left and at the right with respect to the roller 20 (see FIG. 1). One end of a spring 23 is connected to a fixed point 24 on the plate 6, while the other end is fixed to a point 25 on the dynamometric arm 18.

To assist in understanding the operation of the braking device 12 and of the tension sensitive device 13 associated with it, the other elements situated on the plate 6, namely, the twisting roller 27 and the two shaping rollers 28 and 29, will be described next. The twisting roller 27 leads the strap 10a tangentially to the mandrel, while the shaping rollers 28 and 29 impart to the strap the desired curvature when this is required, for example, to produce waveguides of the type disclosed in United States application Ser. No. 139,633, filed May 3, 1971 and assigned to the assignee of this application.

The straps 10a and 10b are wound up about the mandrel by rotation of the shaft 2 and are pushed along the mandrel 3 itself by the advancing system 11, which will be described hereinafter. The control of the tension of the strap 10a, due to the braking device 12, is carried out by means of the tension sensitive device 13.

IF the tension of the strap 10a were too high, the right hand end of the dynamometric arm 18 (FIG. 1) on account of said tension, would be moved upwardly, overcoming the return force exerted by the spring 23 and, by rotating about the pivot pin 19, the arm 18 will displace the point of connection 17 of the end of the belt 15, thereby reducing the contact of the belt 15 with the pulley 14 and reducing the braking force on the reel 8.

When the tension on the strap 10a is reduced, with a consequent lowering of the right hand end of the arm 18, the spring 23 will bring the tension sensitive device 13 to a new position of equilibrium.

What has been described in respect of the braking device 12 and of the tension sensitive device 13 employed for the strap 10a paid off from the reel 8, applies also to the braking and tensioning of the second strap 10b. The reel 9 (FIG. 2) is mounted on a plate similar to the plate 6 and is equipped with a braking pulley 30, a twisting roller 31 and rollers and a tensioning device like those used to control the feed of the strap 10a from the reel 8.

The components of the advancing system 11 are shown in expanded, perspective form in FIG. 3, and the system 11 comprises a support 32, coaxial and fixed in position with respect to the mandrel 3. FIGS. 3 and 4 illustrate the principles of an advancing system 11 used when only a single-start helix 10, i.e., a helix formed from a single strap, such as strap 10a, is formed. FIGS. 5 and 6 illustrate an advancing system 11 for a multistart helix.

The support 32 is provided with a plurality of holes 34 arranged in a circle, in which small pistons are slidably fitted, only one such piston, piston 33, being shown in FIG. 3, but the other pistons are similarly mounted, constrained and operated.

The piston 33, slidable in a hole 34, cannot rotate about its own axis because of a control element 35, which is secured to the piston 33 by a pin 35a extending through the element 35, and the piston 33 has an arm 35b which extends into a groove 36 in the support 32. A spring 37 is arranged about the piston 33 and opposes any movement of the piston 33 in the direction of the mandrel 3 from the reels 8 and 9. The piston 33 has a hammer-shaped head with a guiding conical surface 39 merging with a surface 40 defined by a portion of a helix so as to fit the contour of the portion of the helical turn which it engages.

The advancing system 11 also comprises a cam 38 coaxial with the mandrel 3 and secured to the winding shaft 2. Accordingly, the cam 38 rotates with respect to the pistons which are progressively pushed towards the press 4.

When the advancing system is to be used to wind a multi-start helix, i.e., with two or more straps as illustrated in FIGS. 1 and 2, an increased number of pistons 33 and a modified can 38 are used, the cam 38 in the embodiment in FIGS. 3 and 4 having a single raised portion 38a. FIG. 5 illustrates the heads of an advancing system for a two-start helix, the advancing system comprising a support 32a and 12 pistons with heads A, B, C, D, E, F for one start and A', B', C', D', E' F' for the other start.

FIG. 6 is a diagram representing the twelve pistons 33 with heads A, B, C, D, E, F and A', B', C', D', E', F', and the profile of the cam 38 laid out on a flat surface. EAch piston 33, at one end, contacts the actuating surface 38b and, at the other end, (through the heads) the portions b and b' of the two starts of the helix.

Assuming that the direction for the movement of the cam 38 is that indicated by the arrow 50 in FIG. 6, the following portions of the cam profile will successively act on each piston 33, e.g., the piston having the had b':

a a first portion c contained in a plane orthogonal to the direction of the mandrel axis;

b a second portion d where the cam profile has an increased slope;

c) a third portion e having a helical profile; and d) a fourth portion f in which the height of the profile is decreasing in any desired way.

Consequently, each piston 33 carries out a to and fro movement, taking successively all the positions which in FIG. 6 are occupied by the small pistons A', B', C',D', E', F', so that, for example, the strap length which is in contact with the head A' is gradually pushed by this head A' towards the press 4.

Considering the timing illustrated in FIG. 6, it can be seen that the insertion of the strap 10a takes place in portion c of the cam profile, where, for example, the head A' is withdrawn with respect to the already formed turn of the strap 10b. Portion d represents a zone of connection between the first and the third portion, so that the head may come gradually, and without jumping, into contact with the helical strap 10a. In the third portion e, the pistons push the strap 10a toward the press 4. When the fourth portion f, where the cam has a profile with decreasing height, reaches a piston 33, the piston 33 (see piston 33 with head F') retracts to allow the insertion of the strap for the next turn.

The heads A-E similarly push the strap 10b of the other start and the head F retracts to permit insertion of the strap 10b.

A braking device 12 and an advancing system 11 of the type described hereinbefore have been found to be necessary for the formation of a helix 10 without wrinkles when the strap is wound about the mandrel 3. This requirement, that is, lack of wrinkles, must be complied with, as the helix, for a good waveguide structure, must reach the press 4 without the turns thereof being disarranged irregularly with respect to each other.

The braking device 12 carries out a continuous adjustment of the tension on the strap to such a value that the strap, wound up about the mandrel 3 by means of the rotation of the supports for the reels 8 and 9, adheres perfectly to the outer surface of said mandrel 3. The advancing system 11 provides the necessary continuous thrust on the turn of the waveguide being formed to overcome the friction caused by the contact of the helix 10 with the mandrel 3 and to displace the helix 10 along the mandrel 3.

To facilitate the advancement of the helix turns without causing their disarrangement, the mandrel 3 is provided (see FIG. 4) with a first portion 3' followed by a second portion 3'' of smaller diameter, the two portions being connected to each other by a surface 3'''having a gradual slope, for example, a surface having the shape of a truncated cone.

The first portion 3' is of such a length as to contain the winding of a small number of turns. When the turns are pushed towards the second portion 3'' by the advancing system 11, they contract on a smaller diameter by virtue of the elastic spring back of the material of the straps, and this happens in consequence of the tension tangential to the mandrel 3 which is imparted to the turns at the time of their winding up on the mandrel 3.

The reduction of diameter of the mandrel 3 must be selected in such a way that there are still turns subjected to a small residual tension, sufficient to prevent their disarrangement, but the tension must not be so high as to make it difficult to advance the helix longitudinally of the mandrel 3. To establish the value of the winding tension, the braking device 12 is adjusted so as to impart to the strap the minimum tension which may prevent the formation of wrinkles of the turns on the mandrel 3. The tension is then gradually increased in order to have the desired residual tension on the turns situated on the second portion 3'' of the mandrel 3. As mentioned hereinbefore, said residual tension must be such as to avoid any disarrangement of the turns themselves.

Of course, the maximum permissible tension value will be also that consistent with the pushing ability of the advancing system 11 on the first portion 3' of the mandrel 3. In fact, as already stated, an increase in tension results in a better adherence of the turns on the mandrel 3, so that there is a greater resistance to the advancement of the turns themselves on account of friction.

The apparatus of the invention has been described hereinbefore with respect to its main components, which are a braking device 12, an advancing system 11 and a mandrel 3 whose diameter decreases towards the press 4. The following description will illustrate how the strap is driven and deformed before it reaches the mandrel 3.

In the case of a two-start helix, the strap 10a coming from the reel 8 passes, at first, partly around the return roller 21 and then round the dynamometric roller 20. After leaving the roller 20, the strap 10a passes on the return roller 22 and then to the twisting roller 27 which directs the strap 10a tangentially to the mandrel 3. The strap 10a, now having a correct inclination with respect to the mandrel 3, is deformed to the desired curvature between the two shaping rollers 28 and 29. The return rollers 21 and 22 and the shaping rollers 28 and 29 are rotatably mounted on shafts secured to the supporting plate 6, which is secured to and rotates with the winding shaft 2. Therefore, said rollers 21, 22, 28 and 29 and the reels 8 and 9 rotate about the main shaft 1. The winding shaft 2 is supported from the main shaft 1 by rolling bearings, such as the bearings 41 at one end of the shaft 2.

The strap 10a, because of rotation of the winding shaft 2 about the mandrel 3, is wound on edge about the latter and the turns are pushed towards the press 4 by the above described advancing system 11.

As mentioned hereinbefore, the reel 9 is like the reel 8, is similarly mounted and is asociated with corresponding return, twisting and shaping rollers. Accordingly, the strap 10b is wound on the mandrel 3 in the same manner as the strap 10a is wound thereon. Of course, by omitting the reel 9 and its associated parts or the strap 10b and substituting the proper advancing system 11, described hereinbefore, the apparatus of the invention may be used to wind a single-start helix.

The shaft 1 is supported by a frame 43, and the shaft 2 is driven by a motor 42 through a speed reducer 44 and a belt 45 which interconnects the reducer 44 and the shaft 2.

One of the main advantages of the described apparatus is that an advancing device 11 is provided for the helix 10, which acts in a substantially continuous and gradual manner. In fact, since the thrust imparted by the cam 38 must overcome both the friction between the turns of the helix 10 and the mandrel 3 about which they are wound up and the springs 37 which oppose the movement of the pistons 33, the springs 37 aid in making certain that the pushing action is carried out without any excessive acceleration.

Another advantage of the apparatus of the invention is due to the continuous adherence of the pistons 33 to the cam 38. In fact, said pistons 33 are pushed by the springs 37 against the cam profile, thereby permitting the turns to be advanced without discontinuity.

A further advantage of the apparatus of the invention is that the heads of the pistons have the hammer shape illustrated. Such heads provide a truncated conical surface 39 followed by a surface 40 having the shape of a helix. The straps 10a and 10b usually are insulated with a thin layer of insulation, e.g., enamel, and when they are wound on the mandrel 3 they are guided by the conical surface 39 formed by the heads of the pistons 33 and thereafter contact the helical surface 40, without damaging, during their contact with such surfaces, the layer of insulating enamel which cover them.

Although only preferred embodiments of the invention have been described, it will be undersood by those skilled in the art that various modifications may be made without departing from the principles of the invention.

What is claimed is:

1. Apparatus for forming at least one strap having a width greater than its thickness into a cylindrical helix with the width dimension of the strap in a plane extending at an angle to the axis of the helix, said apparatus comprising a cylindrical mandrel, winding means rotatable around said mandrel for forming turns of said helix on said mandrel and comprising supply means for carrying said strap and feeding it to said mandrel with said width dimension in said plane, and tensioning means engageable with said strap for controlling the tension on said strap as it is fed to said mandrel, and advancing means engageable with a turn of said strap on said mandrel for pushing said turns along said mandrel.

2. Apparatus as set forth in claim 1, wherein said mandrel has a diameter at the portion thereof which receives said strap which is greater than the diameter of a second portion thereof spaced from said first-mentioned portion, said first-mentioned portion being interconnected with said second portion by an intermediate portion of smoothly and gradually decreasing diameter.

3. Apparatus as set forth in claim 1, wherein said advancing means comprises a cam coaxial with and rotatable around the axis of said mandrel, said cam having a cam surface extending around the axis of rotation of said cam and facing toward said mandrel and a plurality of means engageable with said cam surface for movement thereby in a direction axially of said mandrel and engageable with a turn of said strap on said mandrel.

4. Apparatus as set forth in claim 3, wherein said cam surface has first, second, third and fourth adjacent portions disposed around said axis with respect to each other, said first portion being more remote from said turn than the remainder of said portions to permit the insertion of said strap between one of said plurality of means and a previously formed turn of said strap, the second portion having a slope extending toward said turn from said first portion, the third portion having a slope extending toward said turn from said second portion to move said turn axially of said mandrel and the fourth portion extending from the end of said third portion in a direction away from said turn and to a distance from said turn substantially equal to the distance of said first portion from said turn.

5. Apparatus as set forth in claim 4, wherein said fourth portion has a slope greater than that of said third portion.

6. Apparatus as set forth in claim 4, wherein at least said third portion has a surface in the shape of a portion of a helix.

7. Apparatus as set forth in claim 3, wherein said plurality of means comprises a non-rotatable support intermediate said cam surface and said turn, a plurality of pistons slidably mounted on said support in side-by-side relation around an axis coaxial with said axis of said mandrel, each of said pistons being slidable in a direction axially of said mandrel and having one end thereof engageable with said turn and spring means for urging said pistons away from said turn and the other ends thereof into engagement with said cam surface.

8. Apparatus as set forth in claim 7, wherein each of said pistons has a hammer-shaped head at said one end thereof, each said head, in a cross-section taken axially of said mandrel, having a first, turn-engaging surface extending at first angle to said axis of said mandrel and a second, guiding surface extending at an angle less than said first angle to said axis, said heads being disposed side-by-side so that the guiding surfaces form a conical guiding surface, and said first surface in a direction circumferentially of said axis of said mandrel being defined by a portion of a helix.

9. Apparatus as set forth in claim 8, wherein said heads are in abutting relation at least at the ends of the first surfaces thereof to provide a substantially continuous, turn thrust surface extending circumferentially of said axis of said mandrel.

10. Apparatus as set forth in claim 1, wherein said supply means comprises a rotatable reel mounted on a support rotatable around an axis coaxial with the axis of said mandrel and said tensioning means comprises a brake connected to said reel and having adjusting means, a roller mounted on said support for engaging said strap intermediate said reel and said mandrel, said roller being mounted for movement transverse to its axis, and means controlled by said roller and responsive to movement of said roller transverse to said axis connected to said adjusting means for varying the braking of said reel in accordance with the position of said roller.

* * * * *

UNITED STATES PATENT OFFICE
CERTIFICATE OF CORRECTION

Patent No. 3,793,864　　　　　　　　　Dated　February 26, 1974

Inventor(s)　ANTONIO FERRENTINO

It is certified that error appears in the above-identified patent and that said Letters Patent are hereby corrected as shown below:

Col. 1, line 64:　"roation" should read --rotation--

Col. 4, line 10:　after "pistons" insert --33-- line 15:　"can" should read --cam-- line 25:　"EAch" should read --Each-- line 32:　"b'" should read --A'-- line 33:　after "a" (first occurrence) insert --)-- line 35:　after "b" insert --)--

Signed and sealed this 9th day of July 1974.

(SEAL)
Attest:

McCOY M. GIBSON, JR.　　　　　　　　C. MARSHALL DANN
Attesting Officer　　　　　　　　　　Commissioner of Patents